US012619867B2

(12) United States Patent
Fusco et al.

(10) Patent No.: US 12,619,867 B2
(45) Date of Patent: May 5, 2026

(54) AUTOMATED CREATION OF MACHINE-LEARNING MODELING PIPELINES

(71) Applicant: INTERNATIONAL BUSINESS MACHINES CORPORATION, Armonk, NY (US)

(72) Inventors: Francesco Fusco, Maynooth (IE); Fearghal O'Donncha, Aran Islands (IE); Seshu Tirupathi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 17/137,285

(22) Filed: Dec. 29, 2020

(65) Prior Publication Data

US 2022/0207349 A1     Jun. 30, 2022

(51) Int. Cl.
*G06N 3/08* (2023.01)
*G06F 16/901* (2019.01)
*G06F 16/908* (2019.01)

(52) U.S. Cl.
CPC ........... *G06N 3/08* (2013.01); *G06F 16/9024* (2019.01); *G06F 16/908* (2019.01)

(58) Field of Classification Search
CPC ...... G06N 3/08; G06N 20/00; G06F 16/9024; G06F 16/908
See application file for complete search history.

(56) References Cited

U.S. PATENT DOCUMENTS

| | | | |
|---|---|---|---|
| 10,516,890 B2 | 12/2019 | Wang et al. | |
| 10,592,386 B2 | 3/2020 | Walters et al. | |
| 2014/0040275 A1* | 2/2014 | Dang ...................... | G06F 40/30 |
| | | | 707/741 |

(Continued)

FOREIGN PATENT DOCUMENTS

| | | |
|---|---|---|
| WO | 2018213205 A1 | 11/2018 |
| WO | 2019/182590 A1 | 9/2019 |
| WO | 2020/040880 A1 | 2/2020 |

OTHER PUBLICATIONS

Mell, P. et al., "Recommendations of the National Institute of Standards and Technology"; NIST Special Publication 800-145 (2011); 7 pgs.

(Continued)

*Primary Examiner* — Phenuel S Salomon
(74) *Attorney, Agent, or Firm* — CHIP LAW GROUP

(57) ABSTRACT

A computer-implemented method of generating a machine learning model pipeline ("pipeline") for a task, where the pipeline includes a machine learning model and at least one feature. A machine learning task including a data set and a set of first tags related to the task are received from a user. It is determined whether a database stores a first machine learning model pipeline correlated in the database with a second tag matching at least one first tag received from the user. Upon determining that the database stores the first machine learning model pipeline, the first machine learning model pipeline is retrieved, the retrieved first machine learning model pipeline is run, and the machine learning task is responded to. Pipelines may also be created based on stored pipelines correlated with a tag related to a tag in the task, or from received feature generator(s) and models.

17 Claims, 12 Drawing Sheets

From block 810, Fig. 8

From block 812, Fig. 8

(56)        References Cited

U.S. PATENT DOCUMENTS

| | | | |
|---|---|---|---|
| 2018/0052898 A1* | 2/2018 | Allan | G06F 16/435 |
| 2018/0247325 A1* | 8/2018 | Melzer | G06Q 30/0206 |
| 2018/0293517 A1 | 10/2018 | Browne et al. | |
| 2019/0147110 A1* | 5/2019 | Wei | G06F 16/258 |
| | | | 707/747 |
| 2019/0354810 A1 | 11/2019 | Samel et al. | |
| 2020/0012584 A1* | 1/2020 | Walters | G06F 16/2237 |
| 2020/0012962 A1* | 1/2020 | Dent | G06F 9/5011 |
| 2020/0184272 A1* | 6/2020 | Zhang | G06N 20/00 |
| 2020/0202171 A1 | 6/2020 | Hughes et al. | |
| 2021/0089961 A1* | 3/2021 | Zeise | G06N 20/00 |
| 2021/0097444 A1* | 4/2021 | Bansal | G06F 9/546 |
| 2022/0019918 A1* | 1/2022 | Subramanian | G06N 5/04 |
| 2022/0108210 A1* | 4/2022 | Wijaya | G06F 11/3409 |
| 2024/0054406 A1* | 2/2024 | Bhise | G06F 18/2163 |

OTHER PUBLICATIONS

He, X. et al., "AutoML: A Survey of the State-of-the-Art"; arXiv:1908.00709v5 [cs.LG] (2020); 33 pgs.
Waring, J. et al. "Automated machine learning: Review of the state-of-the-art and opportunities for healthcare". Artificial Intelligence In Medicine (2020), vol. 104, 12 pgs.

* cited by examiner

FIG. 5

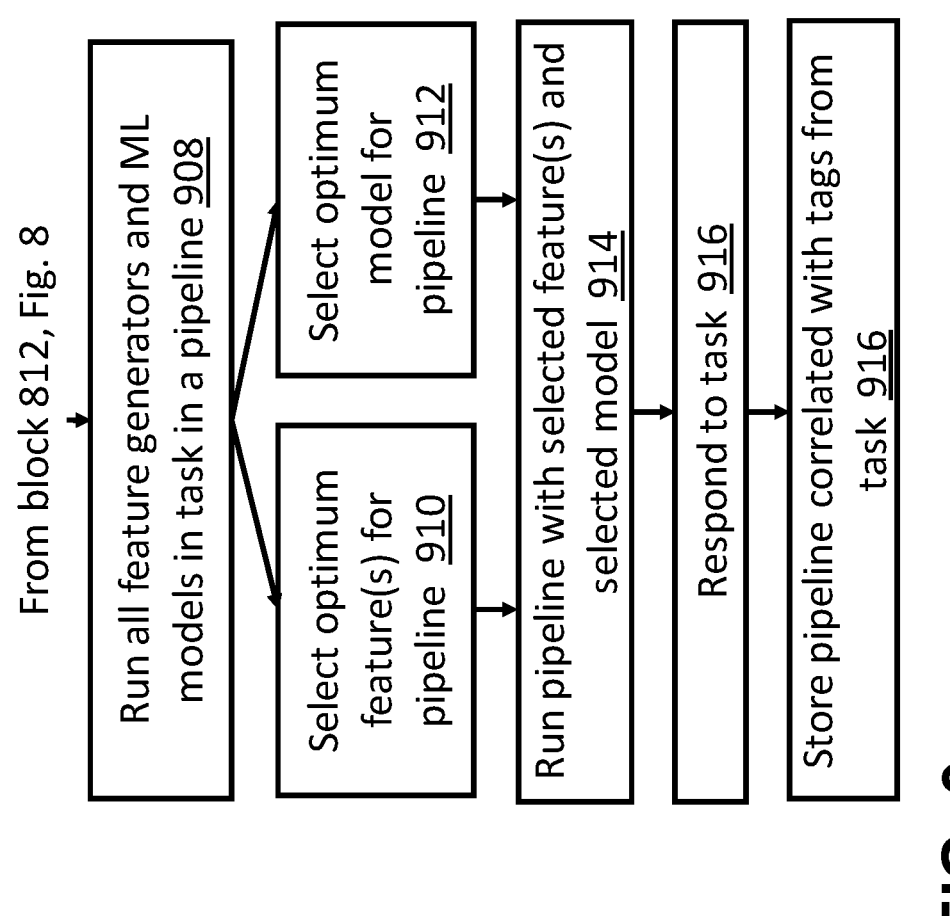

From block 812, Fig. 8

Run all feature generators and ML models in task in a pipeline 908

Select optimum feature(s) for pipeline 910

Select optimum model for pipeline 912

Run pipeline with selected feature(s) and selected model 914

Respond to task 916

Store pipeline correlated with tags from task 916

From block 810, Fig. 8

Retrieve pipeline correlated with tags in task 902

Run selected pipeline 904

Respond to task based on selected pipeline 906

FIG. 9

AUTOMATED CREATION OF MACHINE-LEARNING MODELING PIPELINES

BACKGROUND

Technical Field

The present disclosure generally relates to automated machine learning model pipelines, and more particularly, the creation of automated machine learning model pipelines using tagged pipeline building blocks and the reuse of related pipelines.

Description of the Related Art

Automated machine learning ("AutoML") systems automate aspects of the process for generating a machine learning predictive model. Given a data set and machine learning task, such as regression or classification, for example, AutoML systems can automatically generate artificial intelligence model pipelines that define different aspects of feature engineering, data cleaning, model training/selection, etc., to optimally perform a task.

The execution of an AutoML method generally involves large amount of computational resources. In some applications, such as Internet of Things, a large number of modelling tasks are handled, such as time-series prediction in finance and energy, for example. Generating an AutoML pipeline for each task independently can be expensive and very inefficient.

SUMMARY

According to various embodiments, a method, a computing device, and a non-transitory computer readable storage medium, are provided for generating a machine learning model pipeline for a task, where the machine learning model pipeline includes a machine learning model and at least one feature. A machine learning task including a data set and a set of first tags related to the task are received from a user. It is determined whether a database including a machine learning model pipelines library stores a first machine learning model pipeline correlated in the database with a second tag matching at least one first tag received from the user. Upon determining that the database stores the first machine learning model pipeline, the first machine learning model pipeline is retrieved, the retrieved first machine learning model pipeline is run, and the machine learning task is responded to based on an output of running of the machine learning model pipeline. In another example, if it is determined that a first machine learning model pipeline is not stored in the database, a search of the database is performed for a second machine learning model pipeline correlated with a third tag related to first tag. If a second machine learning pipeline is located, the second machine learning pipeline is retrieved and used to create a machine learning model pipeline for responding to the request. In another example, if a first machine learning pipeline correlated with a first tag and a second machine learning model pipeline correlated with a third, related tag are not found in the database, a third machine learning model is created for responding to the task based on received feature generators and received machine learning models. The created third machine learning model pipeline is stored in the database, correlated with the tag(s) provided with the task.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 5 is a block diagram of an example of a tags library, in accordance with an embodiment.

FIG. 9 is a continuation of the flow chart of an example of a flowchart for generating a machine learning model pipeline of FIG. 8, in accordance with an embodiment.

DETAILED DESCRIPTION

Overview

Figure 1:
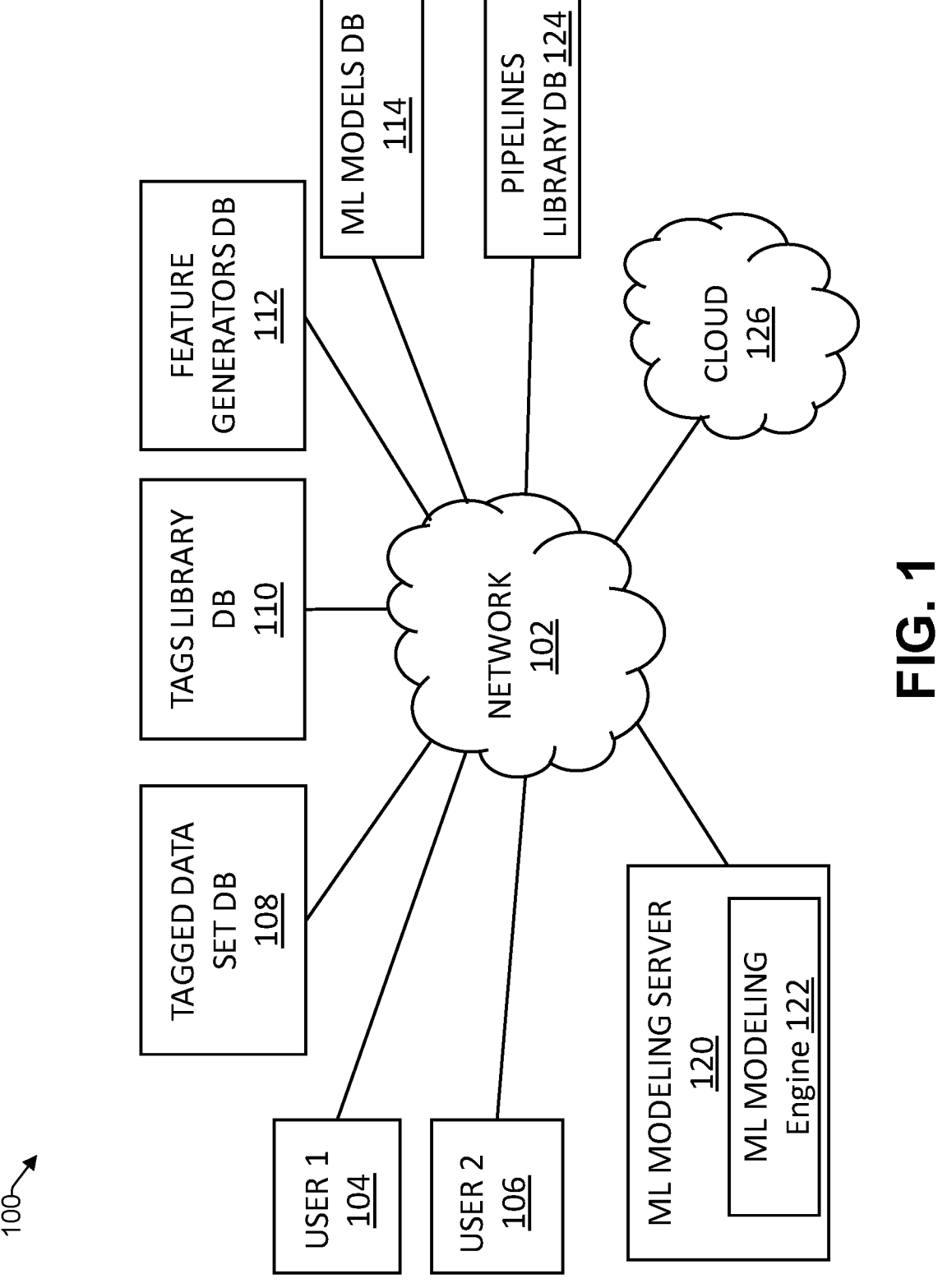
FIG. 1 is an example of a block diagram of system for automatically generating machine learning modeling pipelines, in accordance with an embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods for automatically generating a machine learning model pipeline for a task based on tagged building blocks. In one example, a user requesting a task, such as a prediction made on a set of data, may provide the task, a data set, and one or more tags related to the task, to the system. A tag is a searchable word or phrase that is descriptive of the task, an aspect of the task, or an input to a task, for example. The tags may be text labels, for example. A tags library is also received from the user, which defines relationships between different tags. Examples of relationships between tags include hierarchies, similarities, inheritances, etc. The tags provided with the task may be associated with the data set provided with the task, forming a tagged data set. The tagged data set may be stored in a database, for example. Alternatively, the tags provided with the task may be associated with the task, for example.

The system receives from the user feature generators, which are model building blocks defining one or more steps for selecting and processing data in the data sets to make the desired predictions. The feature generators may include software code or modules for implementing a feature engineering step or a model training routine of a machine learning model, for example. The feature generators generate predetermined features based on the data in the data set. Feature generators may include autoregressive features (seasonality, lags, etc.) based on autocorrelation or spectral analysis for time-series datasets, word-counting or sentence-structure analysis for text data, for example.

For example, if a task is related to energy consumption and a feature generator relates to weather predictions, a weather feature generator may perform calculations related to the feature "temperature" in the provided data set, for example. The features generated by the weather feature generator based on the feature temperature may include average temperature, maximum temperature, minimum temperature, and median temperature of the temperature related data in the provided data set. Other weather-related features that may be generated from the data set by the weather feature generator may relate to precipitation, wind, dew points, and/or air pressure, for example. Another example of a feature generator that may be relevant to predictions related to energy consumption is a calendar feature generator, which may analyze the data set for daily, weekly, monthly, yearly, and/or seasonal patterns, for example.

The system also receives from the user machine learning models that may be used by the system to make the predictions. Examples of machine learning modules may include one or more neural networks having respective characteristics, a linear regression model, a classification model, and hyperparameter tuning for the neural network, for example.

In one example, a prediction is generated for a user based on one or more features and one or more machine learning models that are provided by the user and combined by the system to run the user provided data set. A requested prediction is referred to herein as a task. A machine learning model pipeline created to respond to a task is correlated with the tags provided with the task and stored in a database for later use in responding to tasks having the same or related tags that are received from the same or another user. The machine learning model pipeline may also be correlated with tags related to those provided with the tasks, such as related tags in the related tags library, for example, enabling their use in later machine learning model pipelines to address similar tasks. By virtue of the teachings herein, a technical solution to the problems of the high computational resources, low efficiency, and high costs in the execution of AutoML methods is provided, by enabling the reuse of machine learning model pipelines created to address one task, in the creation of machine learning model pipelines created to address later tasks.

FIG. 1 is an example block diagram of a system 100 for automatically generating machine learning model pipelines, in accordance with an embodiment. The system 100 includes a network 102 that allows various computing devices, such computing device 104 of user 1 and computing device 106 of user 2, to communicate with other elements that are connected to the network 102. Computing devices of only user 1 or computing devices of user 1, user 2, and additional users may be in communication with the network 102.

The user 1 and/or the user 2 in this example provide building blocks for the machine learning modeling pipelines to the system 100 for use in generating the machine learning model pipelines. The building blocks may include tagged data sets, which may be provided to a tagged dataset database 108 via the network 102. Another building block may be a tags library, which may be provided to a tags library database 110 via the network 102. Another building block may be feature generators, which may be provided to a feature generator database 112 via the network 102. Another building block may be machine learning models, which may be provided to a machine learning models database 114 via the network 102.

A machine learning modeling server 120, which includes a machine learning modeling engine 122, communicates with other components of the system 100 via the network 102. The machine learning modeling engine 122, which is a software program running machine learning modeling server 120, generates machine learning modeling pipelines to address tasks provided by the user 1 and the user 2 via the network 102. Pipelines generated by the machine learning modeling engine 122, which include one or more generated features and one or more machine learning models, for example, are also run by the machine learning modeling engine to respond to tasks received from the user 1 and/or the user 2.

Generated machine learning modeling pipelines are stored in a pipelines library database 124. The pipelines in the pipelines library database 124 are correlated with the tag or tags in the received task and the features that resulted in the generated pipeline. Prior to generating a pipeline in response to a task, the tags library database 110 is searched for tags related to the tags in the search. The tags library database 110 may be a node-relationship graph, for example. The related tags may be identified by performing a graph search for all tags connected in a graph to a tag provided with the task, for example. A tag connected to another tag through a common tag may also be related tags. The search may be performed by a tag-based search engine, such as a graph search engine, for example. The entire tags library database 110 may be searched for tags related to the tags received with the task. Alternatively, only the tags library provided by the user with a respective task may be searched for related tags, as desired by a user or set by the system 100.

The pipelines library database 124 is then searched for an existing pipeline correlated with the tag(s) provided with the new task and related tags. If a pipeline is found correlated with at least one tag provided with the task, the pipeline is used to respond to the task. If no pipelines are found correlated with tag(s) in the task, the pipelines library database 124 is searched for pipelines correlated with related tags. If a pipeline is found correlated with a related tag in the task, it is used to respond to the task. In another example, the tags library may be searched for related tags after no pipeline is found correlated with the tag(s) associated with the task. The tags correlated with the pipelines library database 124, which may also be a node-relationship graph, for example, may be searched by a tag-based search engine implemented by the machine learning modeling engine 122, such as a graph search engine, for example.

In another example, the tags provided with a first task via a first tagged data set may be further used when a second task for the first tagged data set is received. The system 100 may then use the tags associated with the first tagged dataset to search for matches with tags correlated with the tagged machine learning pipelines, in addition to the tags provided with the second task, if any. If tags are provided with the second task, this could expand the potential number of relevant machine learning pipelines that may be found The network 102 may be, without limitation, a local area network ("LAN"), a virtual private network ("VPN"), a cellular network, the Internet, or a combination thereof. For example, the network 102 may include a mobile network that is communicatively coupled to a private network, sometimes referred to as an intranet that provides various ancillary services, such as communication with various application stores, libraries, and the Internet. Data processing may also be performed, at least in part, in the cloud 126, which also communicates with other components of the system 100 via the network 102. For example, some or all of the components of the system 100 may be implemented by virtual computing devices in the form of virtual machines or software containers that are hosted in a cloud 126, thereby providing an elastic architecture for processing and storage.

While the tagged dataset database 108, the tags library database 110, the feature generator database 112, and the pipeline library database 122 are shown by way of example as being on different platforms, any two or more databases may be part of the same database.

FIGS. 2-9 are examples of systems and processes implemented by the system 100, in accordance with embodiments of the disclosure. It will be understood that each block of the flowchart illustrations and/or block diagrams, and combinations of blocks in the call flow illustrations and/or block diagrams, can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

Figure 2:
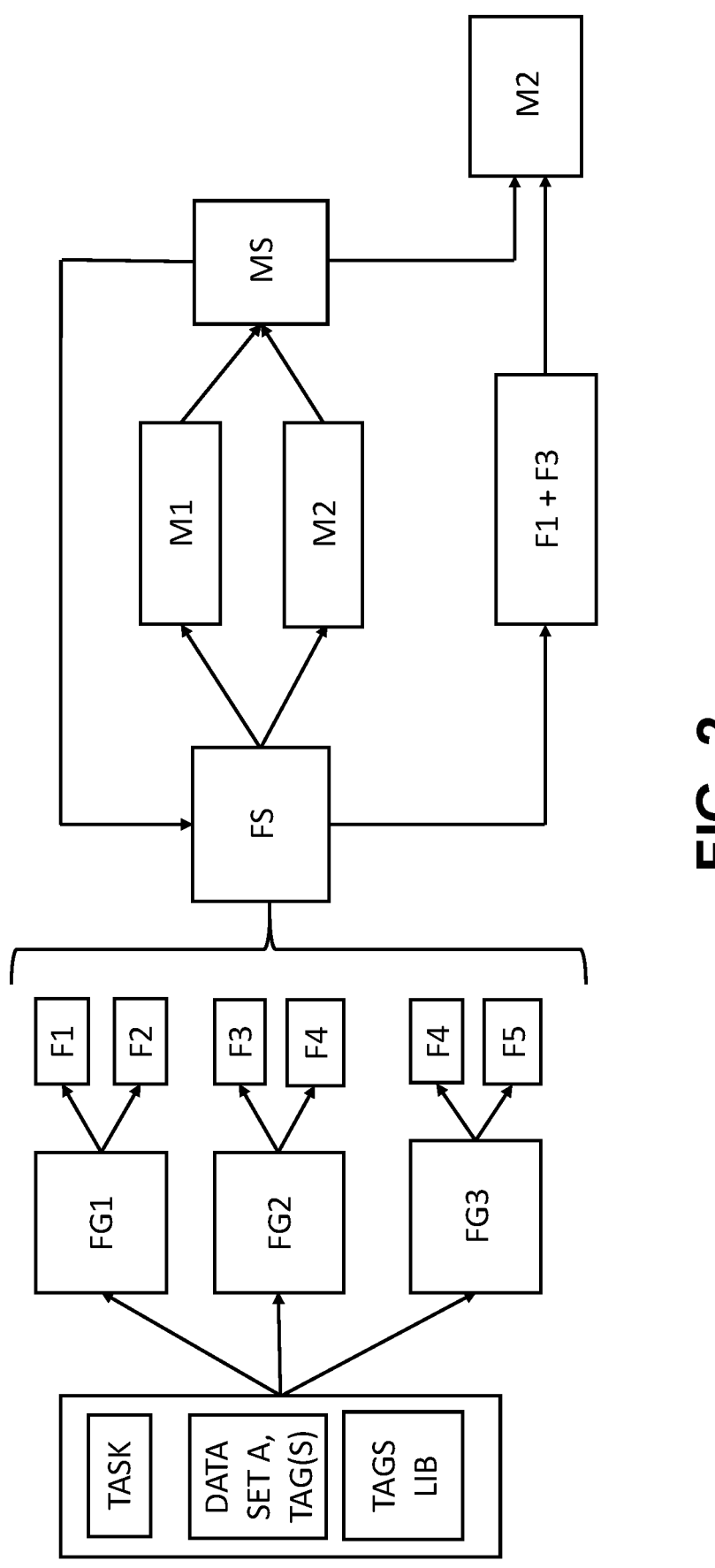
FIG. 2 is a block diagram of an example the generation of a machine learning model pipeline, in accordance with an embodiment.

In one example of the operation of the system 100 of FIG. 1, the machine learning modeling engine 122 may not find any pipelines in the pipelines library database 124 having the same tag(s) as the tag(s) provided by the user with the task or related tags in the tags library database 110. In this case, all feature generators and machine learning models provided by the user are run by the machine learning modeling engine 122 in different combinations in order to identify an optimal combination of features and machine learning model to address the task. The machine learning modeling engine 122 may be configured to run an AutoML routine to generate a pipeline for the new task, for example. The optimal results for each intermediate block are stored. FIG. 2, which is a block diagram of the operation of the system 100, in this example.

In the example of FIG. 2, the user, such as the user 1 in FIG. 1, provides to the system 100 a task, a tagged data set A including tag(s) and ground truth data (not shown), a tags library, three feature generators FG1, FG2, FG3, and two models M1, M2. Alternatively, the ground truth may be provided with the task, separate from the tagged data set A, for example. The task and the tagged data set A are shown being provided to all the feature generators FG1, FG2, FG3, for use in generating features by the ML modeling engine 122 of FIG. 1. Feature generator FG1 in the example of FIG. 2 generates two features F1, F2 based on data from the data set. Feature generator FG2 in this example generates two features F3, F4 based on data from the on the data set. Feature generator FG3 in this example generates two features F5, F6 based on data from the on the data set. More or fewer feature generators may be provided, each generating more or fewer features. In addition, more or fewer models may be received from the user 1 by the machine learning modeling engine 122.

The generated features F1, F2, F3, F4, F5, F6 are provided to a feature selection block FS, which provides each feature, which is the data related to each feature from the data set, and all combinations of the features to each model M1, M2. Each model generates a result, such as a prediction, on the provided data set, based on the feature and combination of features provided by the feature selection block FS. A model selection block MS evaluates the results of each iteration and compares the results to the ground truth data to select the best model for responding to the task, in this example M2. The model selection block MS provides the results of the comparisons to the feature selection block FS, which selects the best features for responding to the task. The best features, here F1 and F3, are then provided by the feature selection block FS to the selected model M2.

The feature selection block FS may select generated features based on performance metrics. One or more feature selection algorithms may be used, such as correlation-based selection among generated features; dimensionality reduction, such as principal component analysis (PCA); and/or heuristics based on performance of a machine learning model using different subsets of the features as the feature selection block FS runs concurrently with the model selection block MS. The model selection block MS may also select a model based on performance metrics. In one example, performance metrics are evaluated based on a comparison of a respective model with ground truth data provided with the data set. In another example, heuristic selection is provided using a compromise between performance and complexity scores, where a complexity penalty score may be based on the parameter dimensionality of the model, for example. Feature selection and the model selection may involve many iterations to converge to the optimum feature(s) and model. A number of iterations and/or a time limit may be placed on the process.

In another example of the operation of the system 100 of FIG. 1, a search of the pipeline library database 124 does not identify a pipeline correlated with the tag(s) provided with the task but a search of the tags library database 110 identifies a tag related to the tag in the request. For example, a tag provided with the task may be tag2 and a tag related to tag2 in the tags library database 110 may be tag1, where tag2 is an example or subset of tag1. In one example, tag1 may be "energy generation" and tag2 may be "solar panel," where "solar panel" is a type or example of a source of "energy generation." The search of the pipelines library 124 for the related tag identifies a pipeline correlated with the related tag. In this case, it is not necessary to run every combination of available feature generators, as in the example of FIG. 2, because only those related to the identified machine learning pipeline need be considered.

Figure 3:
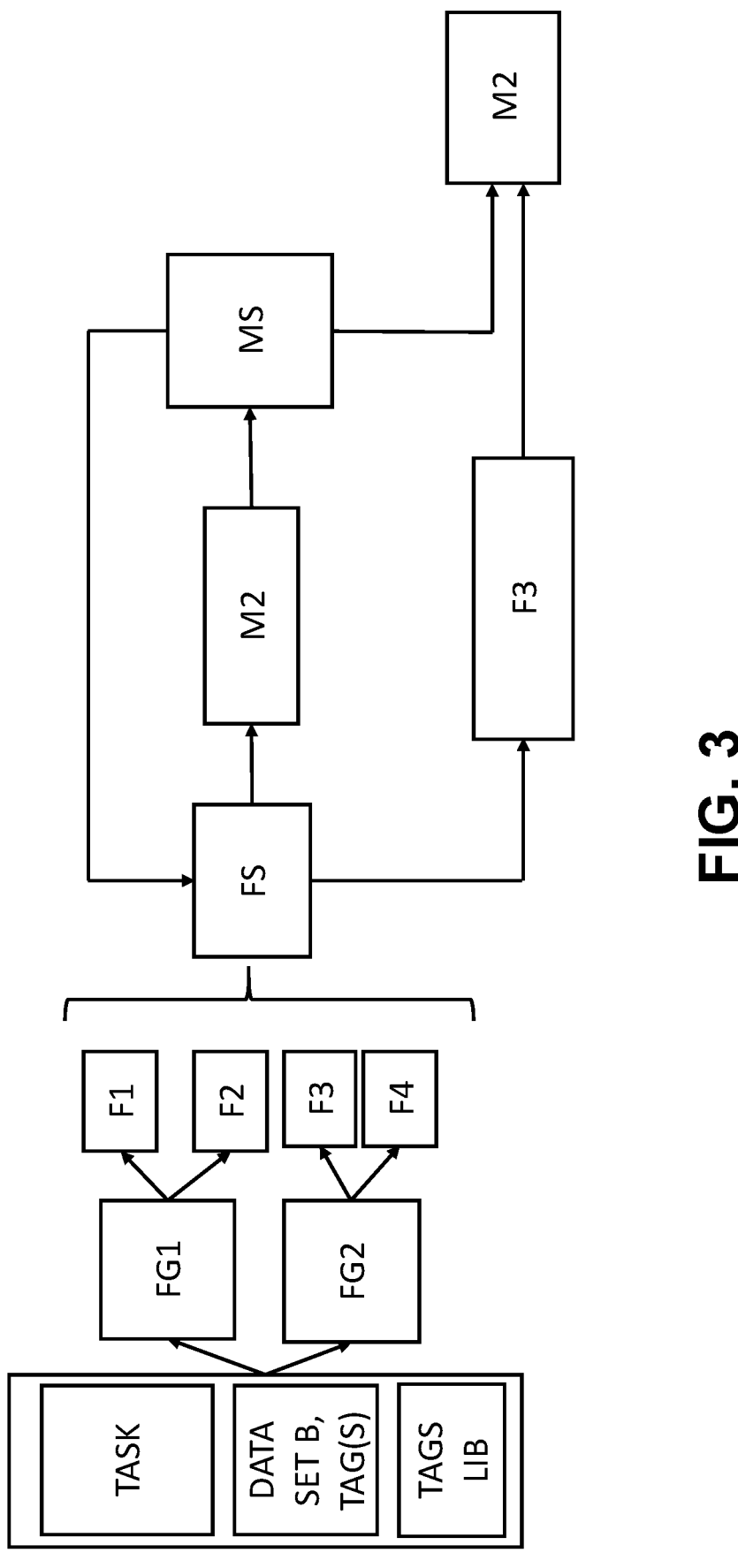
FIG. 3 is a block diagram of an example of the generation of a machine learning model pipeline, in accordance with an embodiment.

FIG. 3 is a schematic representation of the operation of the system 100 when a machine learning model pipeline correlated with a related tag is located. The feature generators FS, the model selector MS, and the features F1, F2, F3, F4 are the same as in the example of FIG. 2, but that is not required. The task in the example of FIG. 3 is "Predict Data Set B", and the tagged data set is data base B. The tagged data set B is associated with a tag, here tag2, for example, which, according to the tags library, is related to tag1, as being a type or example of tag1. The pipelines library database 124 is searched for tag2 and is also searched for the related tag1. The search in the example of FIG. 3 does not locate a machine learning pipeline identified by tag2 but does locate a machine learning pipeline identified by the related tag1. The located machine learning pipeline is used to create the machine learning model pipeline to be used to respond to the task. Since a related machine learning pipeline is found, the process may be simplified, as shown schematically in FIG. 3. It is inferred by the machine learning model engine 122 that it is not necessary in the example of FIG. 3 to run feature generator FG3 or the model M1, as in FIG. 1, at least initially, because they are not related to tag1 or tag2. FIG. 3 therefore shows only feature generators FG1, FG2, which generate features F1, F2, F3, and F4. It is noted that if running of the retrieved machine learning model pipeline on the data set B does not meet the performance metrics, then an AutoML routine may be run to create a new machine learning model pipeline, as in the example of FIG. 2.

As above, an AutoML routine may be run by the machine learning modeling engine 122 in which the feature selection block FS causes each feature F1, F2, F3, F4, and combinations of each feature, to run on the model M2. The model selection block MS compares the results of running the features F1, F2, F3, F4 and combinations of features to the ground truth set provided in the data set B and provides feedback to the feature selection block FS. In the example of FIG. 3, the feature selection block selects feature F3 for use with the model M2 in the machine learning model pipeline, based on the evaluations described above. If the results of running the features F1, F2, F3, F4 and combinations thereof with the model M2, does not yield a satisfactory result, based on a performance/complexity score, as discussed above, then the process may be repeated with the feature generator F3 and the model M1, as in the example of FIG. 2. The feature generator F3 may be added at the same time as the model M1 is added, or the feature generator F3 may be added to run on the model M2 first. Then, if a satisfactory result is not obtained, the model M1 may be added. In another example, the model M1 is added first and then, if a satisfactory result is not obtained, the feature generator F3 may be added. The task is then responded to and the pipeline is stored in the pipelines library 124 of FIG. 1 correlated with the tags in the task.

Figure 4:
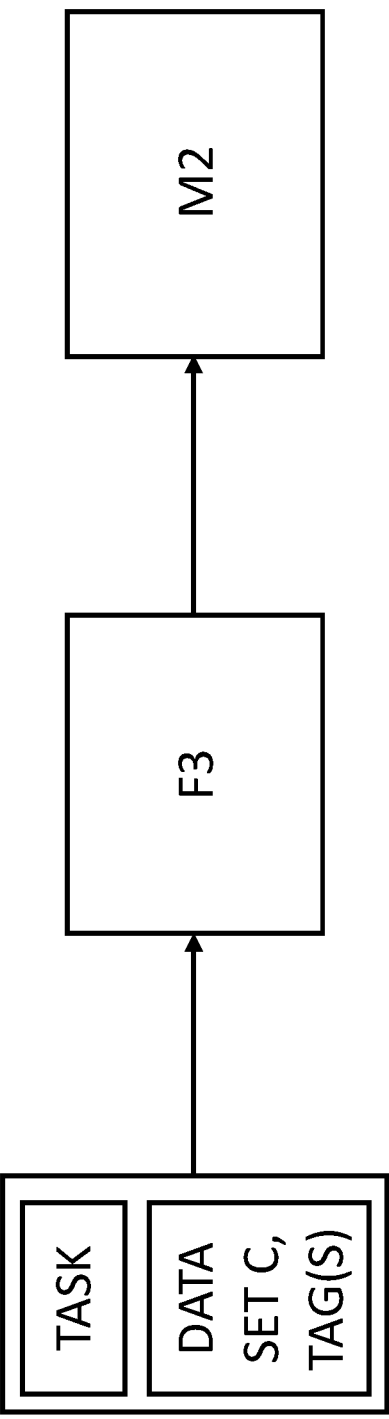
FIG. 4 is a block diagram of an example of the generation of a machine learning model pipeline, in accordance with an embodiment.

In a third scenario involving the same system, the task is "Predict Data Set C", and the tagged data set is also tagged with the tag2. Since in this example there is a machine learning pipeline in the pipelines library 124 correlated with tag2, the search of the pipelines library 124 identifies a machine learning pipeline that is directly applicable to the task. The machine learning pipeline correlated with tag2 in the pipelines library 124 also includes the feature F3. Since a machine learning pipeline directly applicable to the tag in the task was found, that machine learning pipeline and the correlated feature F3 may be used to respond to the task. FIG. 4 is a schematic representation of this example, where the task and the tagged data set C, are provided to the feature F3, which is run on the model M2 by the machine learning modeling engine 122 of FIG. 1. A tags library, which is also provided with the task and tagged data set C, is not shown to simplify the illustration. The feature generators FG1, FG2, FG3, the feature selection block FS, the models M1, M2, and the model selection block MS of FIG. 2 are also provided to the system 100 with the task but are not needed, and it is not necessary to run an AutoML routine. In the example of FIGS. 4, F3 and M2 are the same as in the examples of FIG. 1 and FIG. 2, but that is not required. It is noted that if running of the machine learning model pipeline on the data set C does not meet the performance metrics, then the related tags may be searched in the pipelines library 124, as in the example of FIG. 3. If a machine learning model pipeline correlated with a related tag is found and run, as in the example of FIG. 3, but does not meet the performance metrics, then an AutoML routine may be run with the to create a new machine learning model pipeline, as in the example of FIG. 2.

Figure 5:
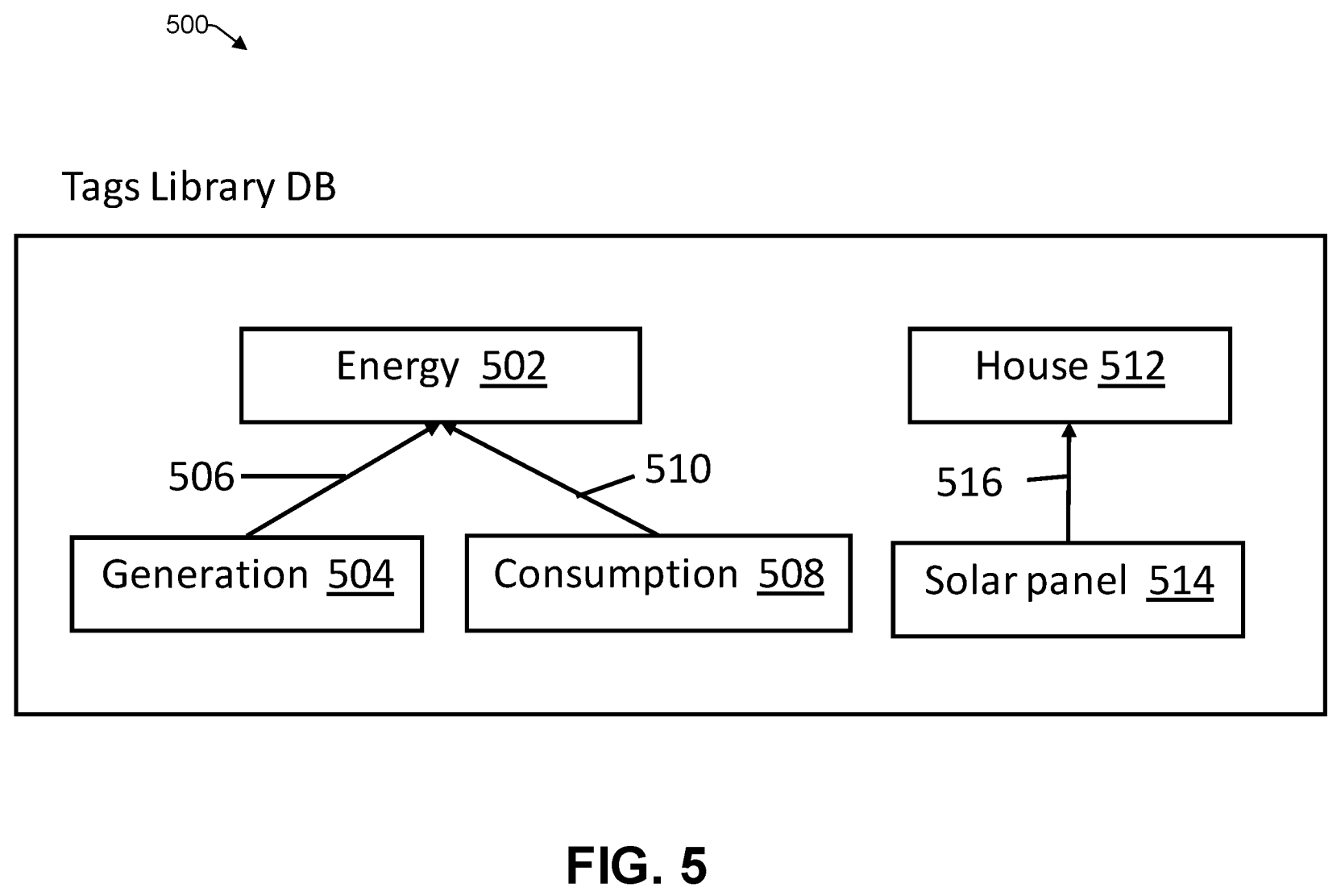

A real-world scenario will now be discussed. A user in this example wants a prediction of energy consumption and generation in a house. The user, such as the user 1 of FIG. 1, provides a tags library 500 to the tags library database 110 of FIG. 1. An example of the tags library 500 provided by the user 1 is shown in FIG. 5. The tags library 500 includes an energy tag 502; a generation tag 504, which is shown related to the energy tag by an arrow 506 indicating a way of creating energy; and a consumption tag 508, which is shown related to the energy tag by an arrow 510 indicating a use of energy. In addition, the tags library 500 includes a house tag 512 and a solar panel tag 514, which is shown related to the house tag by an arrow 516, indicating a part of a house. In another example, "solar panel" may be connected to "generation" in addition to or instead of being connected to "house."

The user 1 in this example also provides a Weather Feature Generator and a Calendar Feature Generator to the feature generators database 112 of FIG. 1, as well as a Neural Network Model, a Linear Regression Model, and a Hyperparameter tuning model for the Neural Network model to the machine learning models database 114 of FIG. 1.

The user 1 provides a task to the machine learning modeling engine 122 of FIG. 1. The task in this example is "Predict a time-series of energy consumption in the house," with the tags "consumption," and "house," and a data set. The tags library database 110 of FIG. 1 is searched for related tags. The tag "energy," which is related to "consumption," and the related tag "solar panel," which is related to "house," are found. "Consumption" may also be considered to be related to "generation" due to their common relation to "energy." "Solar panel" is also related to "house." The pipelines library 124 is then searched for pipelines related to the tags "consumption" and "house" provided with the task and the related tags "energy," "consumption," and "solar panel" from the tags library database 110.

In this example, no model pipelines exist in the model pipelines database 124 of FIG. 1, as in the example of FIG. 2, above. A new AutoML routine is therefore run by the machine learning model engine 122 on the provided data set using all of the provided Feature Generators (Weather Feature Generator and a Calendar Feature Generator), all the resulting features, and all the provided models (a Neural Network Model, a Linear Regression Model, and a Hyperparameter tuning model for the Neural Network model).

After multiple iterations of providing one or more features by the feature selector to each of the machine learning models and providing feedback from the model selector to the feature selector, the model pipeline converges to a neural network model with features of Temperature generated by the Weather Feature Generator, and Season, Time of Day, and Day of Week generated by the Calendar Feature generator, for example. The neural network model can include a particular number of layers, numbers of neurons per layer, connectivity between layers, activation functions (such a sigmoid activation, tan h, for example), as determined by the system 100 by iteratively running the Hyperparameter tuning model, for example, along with the neural network model and the linear regression model. The ML modelling engine 122 of FIG. 1 can now make the prediction and provide it to the user 1.

A pipeline at any given iteration may be used to provide a response to a task. The pipeline may continue to run after a task is responded to and an additional response may be provided as the pipeline evolves. In some examples, the data set provided by a user may include streaming data. In this example, the iterations may continue after initial feature/model selection with the new data. The pipeline may then converge on a new feature/model as new data is processed. In addition, if the AutoML routine is timed out, it may continue to run after a result is provided to a user. If an improved pipeline is developed that provides a better result, the improved pipeline may also be stored in the pipelines library database 124 correlated with the tags in the task. The improved pipeline may replace the prior pipeline that was timed out or may be stored in addition to that pipeline.

Figure 6:
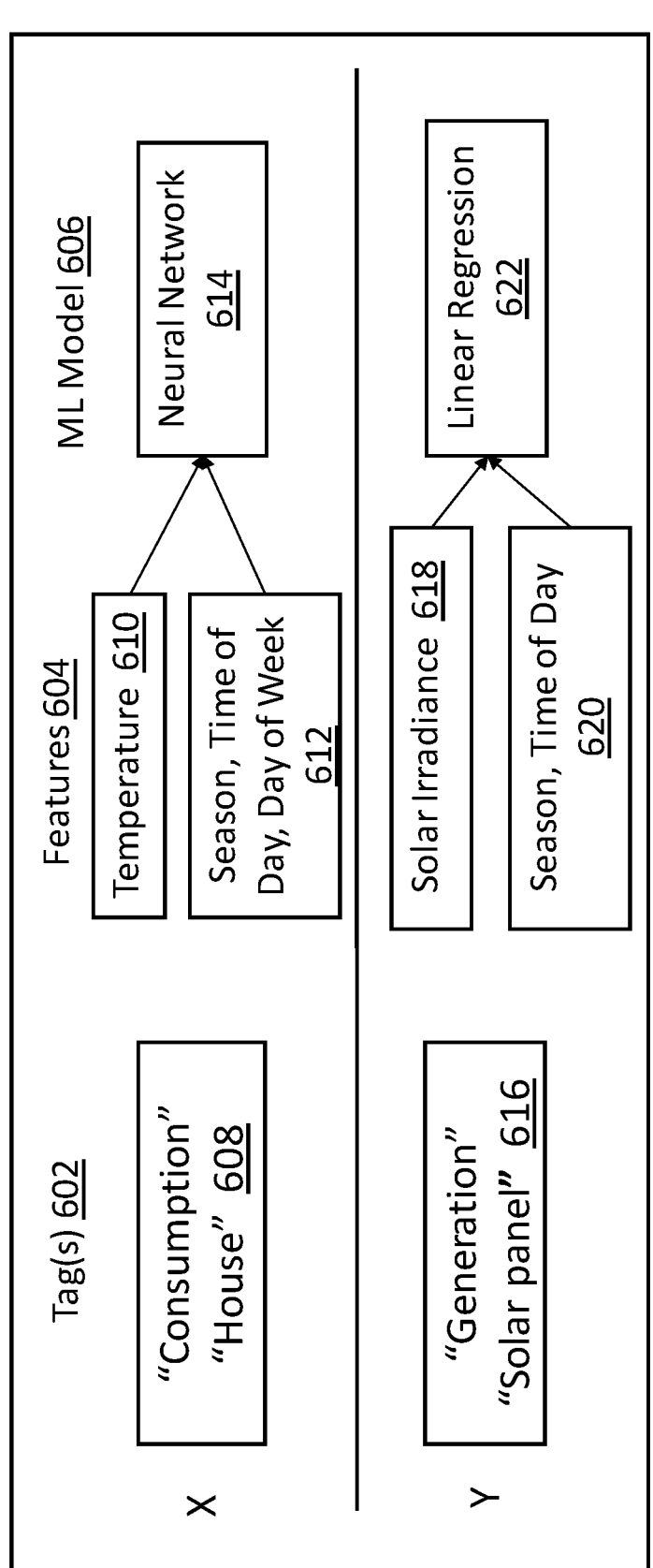
FIG. 6 is a block diagram of an example of a portion of a pipelines library database, in accordance with an embodiment.

The created pipeline including the neural network model with features of "temperature" generated by the weather feature generator, and "season," "time of day," and "day of the week" is stored in the pipelines library database 124 for later use. A portion of the pipelines library database 600 is shown in FIG. 6 including the pipeline X, the correlated tags 602, features 604, and machine learning model 606. In the pipeline X, block 608 includes tags 602 "consumption" and "household" in block 608, the features 604 "temperature" in block 610, "season," "time of day," and "date of the week" in block 612, and the machine learning model 606 "neural network" in block 614. The pipeline X may also be correlated with the additional related tags found in the tags library database 110 in FIG. 1, here, "energy," "consumption," and "solar panel." It is noted that the features "season," "time of day," and "date of the week" are shown together in block 612 because they are generated by the same feature generator.

The same user or a different user, such as user 2, may then submit a second task based on the same data set to the machine learning modeling engine 122 of FIG. 1, here "Predict a time-series of generation by a solar panel," including the tags, "generation" and "solar panel." The machine learning modeling engine 122 of FIG. 1 again runs an AutoML routine including all of the provided Feature Generators (Weather Feature Generator and a Calendar Feature Generator), all the resulting features, and all the provided models (a Neural Network Model, a Linear Regression Model, and a Hyperparameter tuning model for the Neural Network model), with the provided data set. After multiple iterations, a pipeline Y converges to a Linear Regression (LR) model with the features Solar Irradiance, Season, and Time of Day. The machine learning modeling engine 122 can now make the prediction and provide it to the user, such as the user 2, for example.

The machine learning modeling engine 122 also stores the created pipeline Y in the pipelines library database 600, as shown in FIG. 2. The pipeline Y is correlated with the tags

602 provided by the user, here "generation" and "solar panel" in block. Optionally, the related tags "energy," "consumption," and "house" may also be correlated with the pipeline Y. The features "solar irradiance" is shown in block 618 and the features "season" and "time of day" are shown in block 620. The machine learning model 606 is "linear regression" in block 622. As in the pipeline X, the features "season," "time of day," and "date of the week" are shown together in the same block 612 because they are generated by the same feature generator.

In the next example discussed, the first task above, "Predict a time-series of energy consumption in the house," is submitted by a user with the tags "energy" and "house," a data set D, a weather feature generator and a calendar feature generator. The tags library database 110 is searched for the tags "energy" and "house" and finds the tags "consumption" and "generation" related to "energy," and "solar panel" related to "house." The pipelines library 124 is searched for all the tags "energy," "house," "consumption," "generation," and "solar panel." The pipeline X is found in the pipelines library database 600 of FIG. 6 with the user provided tag "house" and also the related tag "consumption." The pipeline Y is also found in the pipelines library database 600 of FIG. 6 with the related tags "generation" and "solar panel." Since two pipelines are found with relevant tags, the two pipelines are merged and an AutoML routine is run to identify the optimum pipeline for the current task. If related tags were not searched for, the pipeline Y, which could further potentially facilitate and improve the generation of the new pipeline related to the present task, would not be found.

Figure 7:
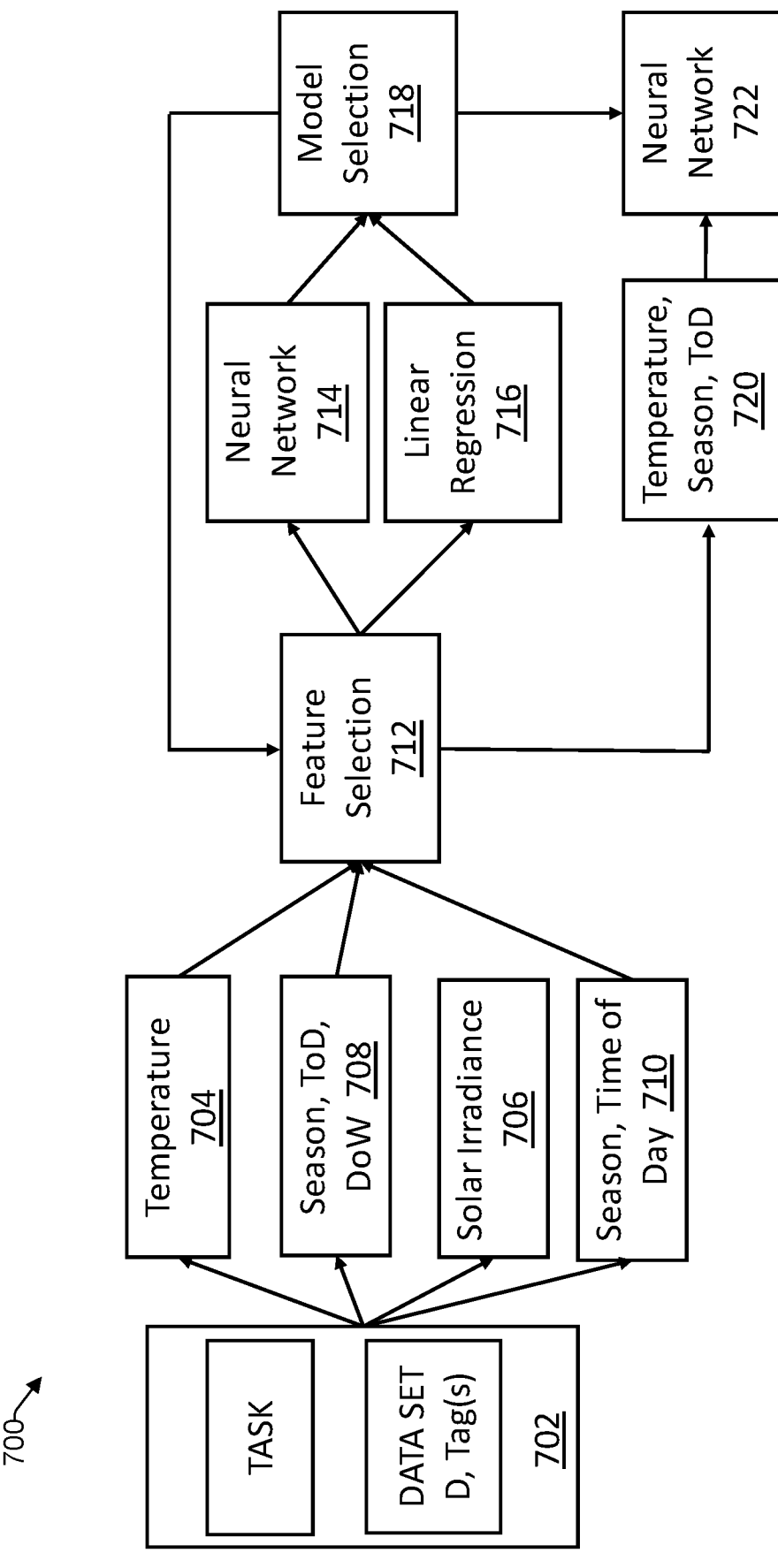
FIG. 7 is a block diagram of an example of the generation of a machine learning model pipeline, in accordance with an embodiment.

FIG. 7 is a block diagram of a process 700 of the generation of a new pipeline based on the pipelines X, Y in this example. The task, the tags, and the tagged data set, here data set D, are input in block 702. Since the weather feature generator feature of temperature 704 is already in the pipeline X and the weather feature generator feature of solar irradiance 706 is already present in the pipeline Y, the weather feature generator is not needed. Similarly, since the calendar feature generator features of season, time of day, and day of the week 708 are already in the pipeline X, and season and time of day 710 are already in the pipeline Y, the calendar feature generator is not needed.

The data from the data set D related to the respective features 704-710 is provided to the feature selection block 712. A neural network model 714 is provided from the pipeline X and a linear regression model 716 is provided from the pipeline Y. As in the example of FIG. 2 and FIG. 3, a model selection block 718 is also provided. The feature selection block feeds the feature data from the blocks 704-710, to each of the neural network model 714 and the linear regression model 716, individually, and in combinations. The model selector block 718 compares the results of running the data in each of the neural network model 714 and the linear regression model 716 to the ground truth data and provides feedback to the feature selector block 712, as discussed above. Based on the feedback from the model selection block 718 and after multiple iterations, the feature selector block 712 selects the optimum one or combination of features to use in the manner discussed above, for example. Similarly, after multiple iterations, the model selection block 718 selects the best model to use, in the manner discussed above, for example. In this example, the feature selection block selects temperature, season, and time of day, in block 720 and the model selection block 718 selects the neural network model.

The techniques described herein may be implemented in a number of ways. Example implementations are provided below with reference to the following figures.

Figure 8:
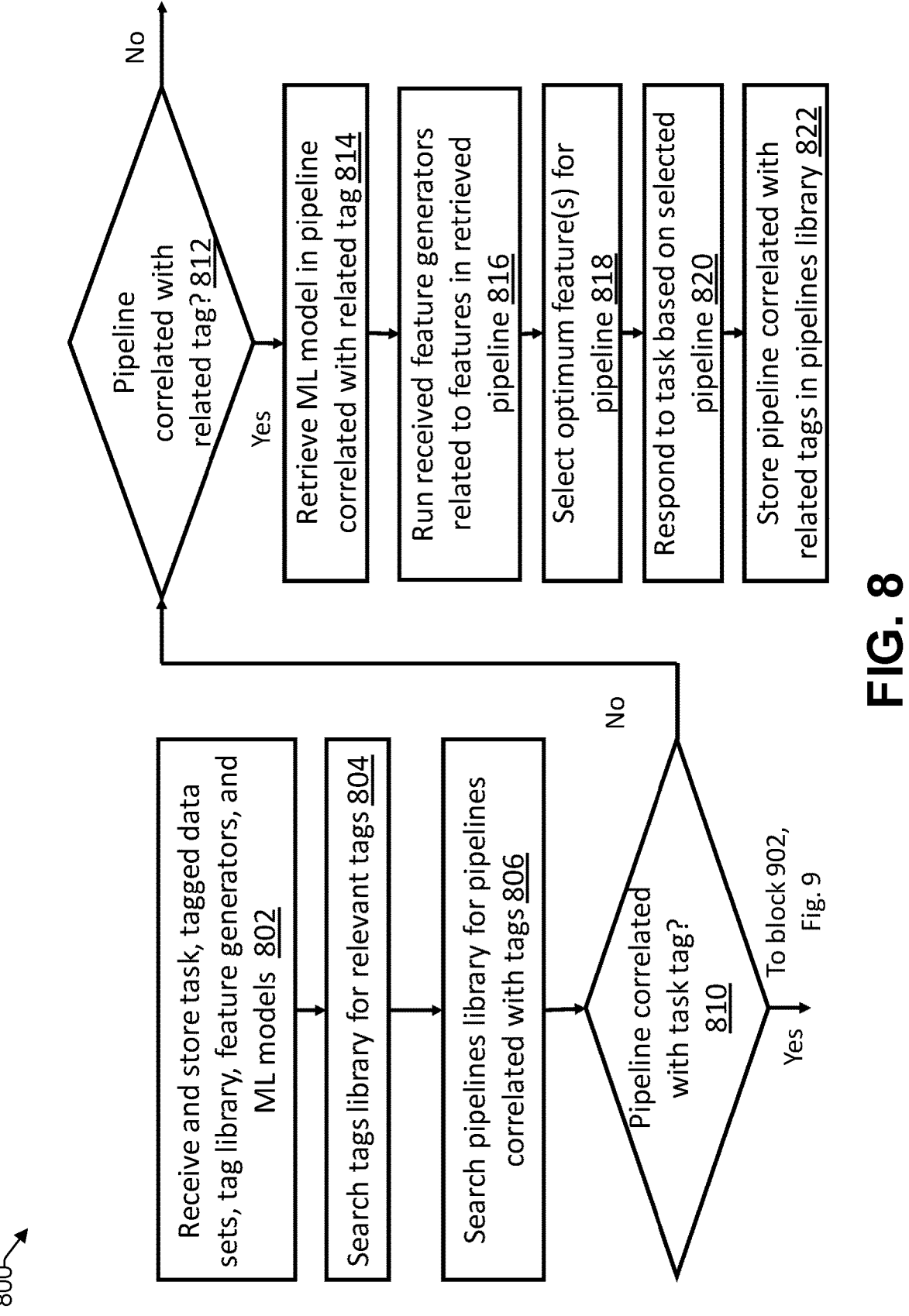
FIG. 8 is a flow chart of an example of a flowchart for generating a machine learning model pipeline, in accordance with an embodiment.

FIG. 8 is a block diagram of an example of a process 800 for automatically generating machine learning pipelines for performing tasks, in accordance with an embodiment. A task, a tagged data set, feature generators, and machine learning models are received from a user and stored by the system 100 of FIG. 1, in block 802. The tagged task may be provided to the machine learning engine 122, the tagged dataset may be provided to the tagged data set database 108, the tags library may be provided to the tags library database 110, the feature generators may be provided to the feature generator database 112, and the machine learning models database 114 for storage, via the network 102.

The tags library in the tags library database 110 is searched by the machine learning modeling engine 122 for tags related to tags in the received task, in block 804. The pipelines library database 124 is searched by the machine learning modeling engine 122 for pipelines correlated with the related tags and the tags in the task, in block 806.

At block 810, the machine learning modeling engine 122 determines whether any pipelines correlated with tags in the task are found. If such a pipeline is found (Yes in block 810), the process 800 continues to block 902 in FIG. 9.

The pipeline correlated with the same tags as the tags in the task is retrieved by the machine learning model engine 122, in block 902. The retrieved pipeline, which includes one or more features and a machine learning model, as discussed above with respect to FIG. 4, is run by the machine learning model engine 122 with the data set provided by the user with the task. The machine learning model engine 122 provides the result of running the pipeline to the user who provided the task, via the network 102, in block 906.

Returning to block 810 of FIG. 8, if a pipeline correlated with a tag provided with the task is not found (No in block 810), the process 800 proceeds to block 812, where the machine learning engine 122 determines whether tags related to the tags provided with the task are found in the pipelines library database 114, in block 804. If one or more such tags were found (Yes in block 812), then the machine learning modeling engine 122 retrieves the pipeline(s) correlated with the related tag in the pipelines library, in block 814.

The machine learning modeling engine 122 runs iterations of the machine learning model in the pipeline, along with the feature generators, as in the example of FIG. 3, in block 816. The optimum features to run with the machine learning model is selected by the machine learning modeling engine 122 by performing feature selection and model selection, in block 818. The pipeline with selected features is run on the dataset and the result is provided to the user in response to the task by the machine learning modeling engine 122 via the network 102, in block 820. The new pipeline is stored in the pipelines library correlated with the tags provided by the user, in block 822.

Returning to block 812, if a pipeline correlated with a related tag is not found (No in block 812), then the process 800 proceeds to block 908 in FIG. 9, where all feature generators and machine learning models provided in the task are run through iterations by the machine learning modeling engine 122, as in the example of FIG. 2. Optimum feature(s) and an optimum machine learning model are selected by the machine learning modeling engine 122 by simultaneously running feature selection and model selection, in blocks 910 and 912. A pipeline with the selected feature(s) and selected machine learning model is run on the data set by the machine learning model 122, in block 914. The result of running the model is sent to the user providing the task by the machine learning model 122, via the network 102, in block 916. The pipeline is stored in the pipelines library database 124 correlated with the tags in the task, in block 918.

Example Computer Platform

Figure 10:
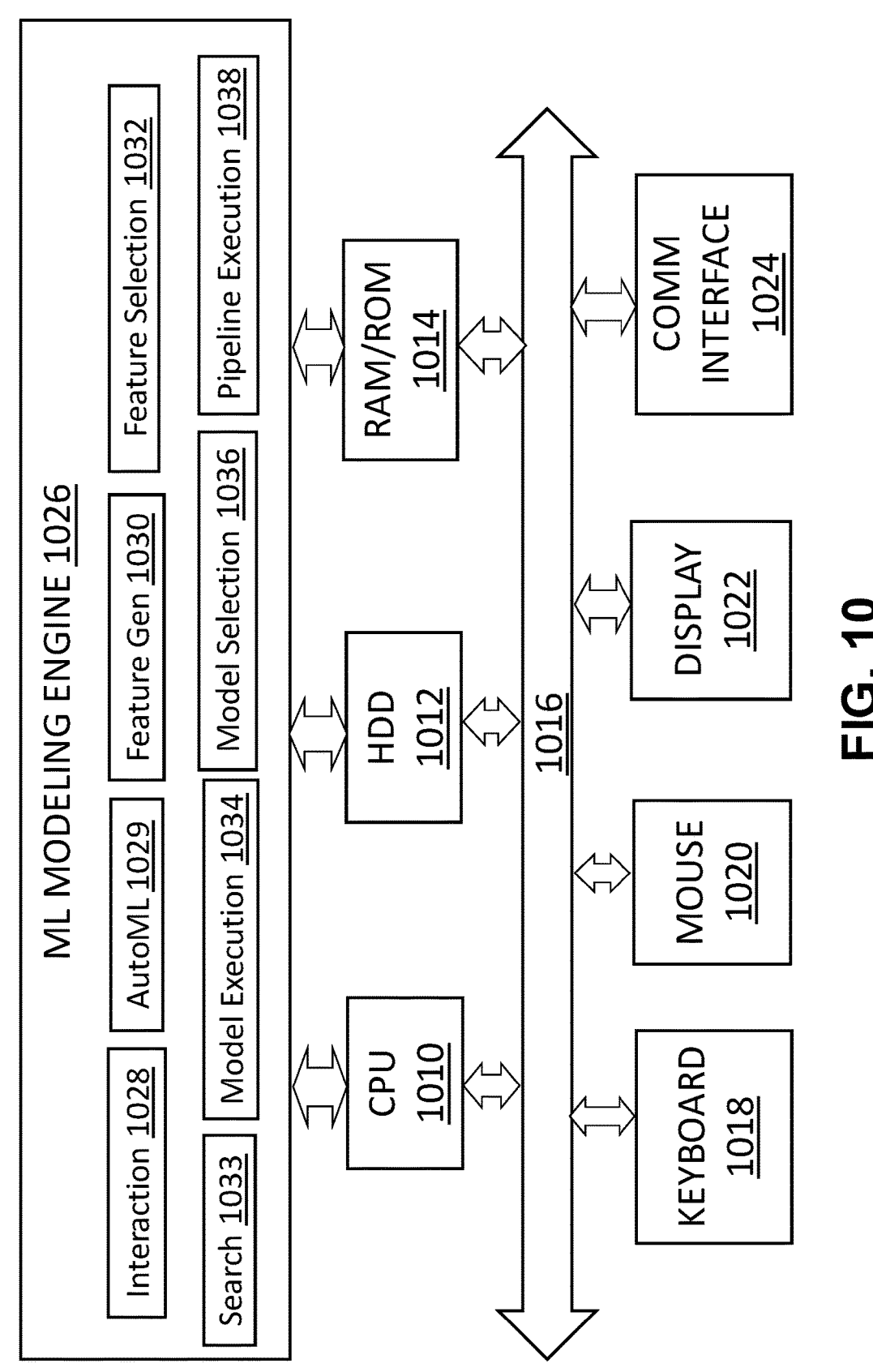
FIG. 10 is an example of a functional block diagram of a computer hardware platform, in accordance with an embodiment.

Functions relating to the generation of machine learning model pipelines to address user provided tasks in accordance with embodiments of the disclosure may be performed with the use of one or more computing devices connected for data communication via wireless or wired communication, for example. FIG. 10 is an example of a functional block diagram of a computer hardware platform 1000, such as a network or host computer platform, that may be used to implement an appropriately configured server, such as the machine learning modeling server 120 of FIG. 1. Other configurations may be used instead.

The computer platform 1000 may include a processing device, such as a central processing unit (CPU) 1010, a hard disk drive ("HDD") 1012, and random access memory ("RAM") and read only memory ("ROM") 1014, which are connected to a system bus 1016. A keyboard 1018, a mouse 1020, a display 1022, and/or a communication interface 1024, may also be connected to a system bus 1016, for example.

A machine learning modeling engine program 1026, which corresponds to the machine learning modeling engine 122 of FIG. 1, can execute various processes in a manner described herein. The machine learning modeling engine program 1026 may be stored in a non-transitory computer readable storage medium, such as the HDD 1012, for example.

The machine learning modeling engine program 1026 may have various modules configured to perform different functions. The modules in the machine learning modeling engine program 1026 may be hardware, software, or a combination of hardware and software, for example. There may be an interaction module 1028 that is operative to receive electronic data from various sources, such as the tagged data set database 108, the tags library data base 110, the feature generators database 112, the machine learning models database 114, and the pipelines database 124 of FIG. 1, for example. The interaction module 1028 may also be operative to receive electronic data, such as tasks, from various sources, such as the user 1 and the user 2 in FIG. 1, for example. The interaction module 1028 is also operative to send electronic data, such as responses to tasks, to various locations, such as to the user 1 and the user 2, as well as to provide pipelines to the pipelines library database 124, for example.

An AutoML module 1029 performs the AutoML routine, as discussed above. A feature generation module 1030 runs the feature generators and features on the received data set in FIG. 2, FIG. 3, FIG. 4, and FIG. 7. A feature selection module 1032 performs the operations of the feature selection block FS of FIG. 2 and FIG. 3, and the feature selection block 712 of FIG. 7, to select optimum features, as described above. A search module 1033 performs searches of the tags library database 110 and the pipelines library database 124. A model execution module 1034 runs the models during the model selection process in FIG. 2 and FIG. 7. A model selection module 1036 performs the operations of the model selection block MS of FIG. 2 and FIG. 3, and the model selection block 718 of FIG. 7, to select an optimum model, as described above. A pipeline execution module 1038 runs the pipelines to respond to a request.

Example Cloud Platform

As discussed above, functions relating to the creation of machine learning modeling pipelines according to embodiments of the disclosure may be performed in whole or in part in the cloud 126, shown in FIG. 1. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
FIG. 11 is an illustrative cloud computing environment, in accordance with an embodiment.

Referring now to FIG. 11, an illustrative cloud computing environment 1100 is depicted. As shown, cloud computing environment 1100 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 12 are intended to be illustrative only and that computing nodes 1110 and cloud computing environment 1150 can communicate with any type of computerized device over any type of network and/or network addressable connection (e.g., using a web browser).

Figure 12:
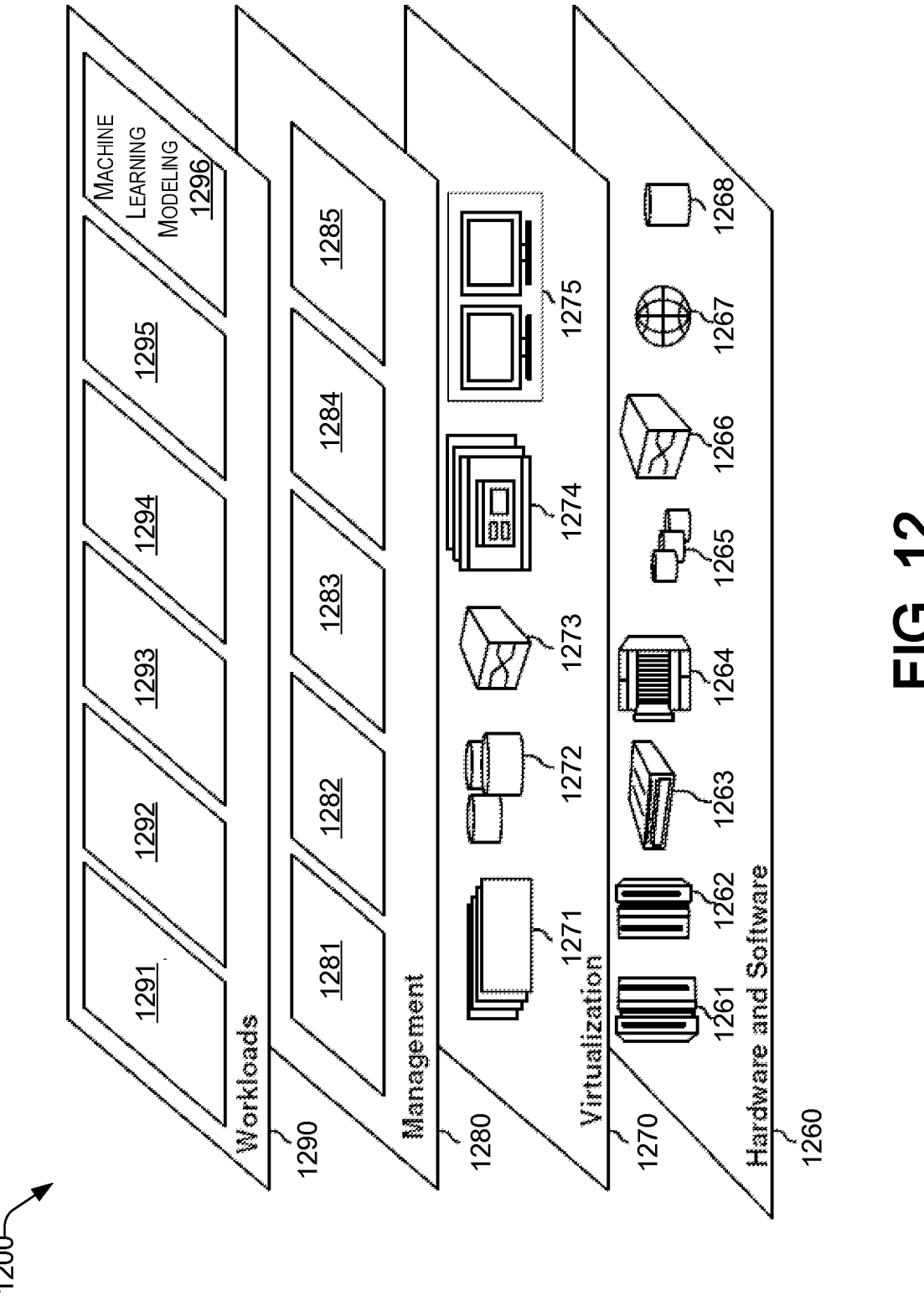
FIG. 12 depicts abstraction model layers, consistent with an illustrative embodiment.

Referring now to FIG. 12, a set of functional abstraction layers provided by cloud computing environment 1200 is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 include hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and machine learning modeling engine 1296, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of generating a first machine learning model pipeline for a machine learning task, the first machine learning model pipeline including a first machine learning model and at least one feature, the computer-implemented method comprising:

receiving, by a computing device, from a user, the machine learning task, a data set, and a set of first tags related to the machine learning task;

receiving, by the computing device, from the user, a feature generator comprising executable logic for generating a first plurality of features based on the data set, wherein the feature generator received, by the computing device, from the user is a model building block that defines one or more operations for selecting and processing data in the data set, the first plurality of features is input to the generated first machine learning model pipeline to perform the machine learning task, and the first plurality of features includes the at least one feature;

receiving, by the computing device, from the user, a tags library, the tags library structured as a node-relationship graph defining relations between the set of first tags; searching, by the computing device, the tags library using a graph traversal algorithm to identify a second tag matching at least one first tag of the set of first tags;

determining, by the computing device, based on the searching of the tags library, whether a database including a machine learning model pipelines library stores the first machine learning model pipeline correlated in the database with the second tag matching the at least one first tag; and upon determining that the database stores the first machine learning model pipeline:

retrieving, by the computing device, the first machine learning model pipeline;

running, by the computing device, the retrieved first machine learning model pipeline on the data set based on the first plurality of features; and responding to the machine learning task, by the computing device, based on an output of the running of the retrieved first machine learning model pipeline.

2. The computer-implemented method of claim 1, further comprising:

upon determining that the first machine learning model pipeline is not stored in the database, searching, by the computing device, the tags library using the graph traversal algorithm to identify a third tag related to the at least one first tag;

determining whether the database stores a second machine learning model pipeline correlated with the third tag; and upon determining that the second machine learning model pipeline is stored in the database:

retrieving, by the computing device, the second machine learning model pipeline;

running, by the computing device, the feature generator and a second machine learning model in the retrieved second machine learning model pipeline for a plurality of iterations to generate a second plurality of features based on the data set;

selecting, by the computing device, one or more features of the second plurality of features;

running, by the computing device, a third machine learning model pipeline with the selected one or more features of the second plurality of features and the second machine learning model;

responding to the machine learning task, by the computing device, based on an output of the running of the third machine learning model pipeline; and storing, by the computing device, the third machine learning model pipeline in the database in correlation with the third tag.

3. The computer-implemented method of claim 2, further comprising:

receiving, by the computing device, a third machine learning model from the user for running a third plurality of features on the data set to perform the machine learning task;

upon determining, by the computing device, that the second machine learning model pipeline is not stored in the database:

running, by the computing device, the feature generator and the third machine learning model for a plurality of iterations to generate the third plurality of features;

selecting one or more features of the third plurality of features;

running a fourth machine learning model pipeline with the selected one or more features of the third plurality of features and the third machine learning model;

responding to the machine learning task based on an output of the running of the fourth machine learning model pipeline; and storing the fourth machine learning model pipeline in the database in correlation with the at least one first tag.

4. The computer-implemented method of claim 3, further comprising:

receiving, by the computing device, a plurality of machine learning models, wherein the plurality of machine learning models is different from the first machine learning model, the second machine learning model, and the third machine learning model;

running, by the computing device, the feature generator and the plurality of machine learning models for a plurality of iterations to generate a fourth plurality of features;

selecting, by the computing device, one or more features of the fourth plurality of features;

selecting, by the computing device, a fourth machine learning model of the plurality of machine learning models;

running, by the computing device, a fifth machine learning model pipeline with the selected one or more features of the fourth plurality of features and the selected fourth machine learning model;

responding to the machine learning task, by the computing device, based on an output of the running of the fifth machine learning model pipeline; and storing the fifth machine learning model pipeline in the database in correlation with the at least one first tag.

5. The computer-implemented method of claim 4, further comprising:

selecting, by the computing device, the one or more features of the fourth plurality of features and the fourth machine learning model based on a performance metric.

6. The computer-implemented method of claim 5, further comprising, after responding to the machine learning task:

continuing to run, by the computing device, the feature generator and the plurality of machine learning models for a plurality of iterations to improve a performance of the fifth machine learning model pipeline with respect to the performance metric.

7. A computing device, comprising:

a processing device;

a storage device coupled to the processing device;

machine learning modeling code stored in the storage device, wherein execution of the machine learning modeling code by the processing device causes the computing device to:

receive, from a user, a machine learning task, a set of first tags related to the machine learning task, and a data set;

receive, from the user, a feature generator comprising executable logic for generating a first plurality of features based on the data set, wherein the feature generator received, by the computing device, from the user is a model building block that defines one or more operations for selecting and processing data in the data set, and the first plurality of features is input to a first machine learning model pipeline to perform the machine learning task;

receive, from the user, a tags library, the tags library structured as a node-relationship graph defining relations between the set of first tags;

search, by the computing device, the tags library using a graph traversal algorithm to identify a second tag matching at least one first tag of the set of first tags;

determine, based on the search of the tags library, whether a database including a machine learning model pipelines library stores the first machine learning model pipeline correlated in the database with the second tag matching the at least one first tag;

upon determining that the database stores the first machine learning model pipeline:

retrieve the first machine learning model pipeline that includes a first machine learning model;

run the retrieved first machine learning model pipeline on the data set based on the first plurality of features; and respond to the machine learning task based on an output of the run of the retrieved first machine learning model pipeline.

8. The computing device of claim 7, wherein the execution of the machine learning modeling code by the processing device further causes the computing device to:

upon determining that the first machine learning model pipeline is not stored in the database, search the tags library using the graph traversal algorithm to identify a third tag related to the at least one first tag;

determine whether the database stores a second machine learning model pipeline correlated with the third tag; and upon determining that the second machine learning model pipeline is stored in the database:

retrieve the second machine learning model pipeline;

run the feature generator and a second machine learning model in the retrieved second machine learning model pipeline for a plurality of iterations to generate a second plurality of features based on the data set;

select one or more features of the second plurality of features;

run a third machine learning model pipeline with the selected one or more features of the second plurality of features and the second machine learning model;

respond to the machine learning task based on an output of the run of the third machine learning model pipeline; and store the third machine learning model pipeline in the database in correlation with the third tag.

9. The computing device of claim 8, wherein the execution of the machine learning modeling code further causes the computing device to:

upon determining that the second machine learning model pipeline is not stored in the database:

run the feature generator and a third machine learning model for a plurality of iterations to generate a third plurality of features;

select one or more features of the third plurality of features;

run a fourth machine learning model pipeline with the selected one or more features of the third plurality of features and the third machine learning model;

respond to the machine learning task based on an output of the run of the fourth machine learning model pipeline; and store the fourth machine learning model pipeline in the database in correlation with the at least one first tag.

10. The computing device of claim 9, wherein the execution of the machine learning modeling code further causes the computing device to:

run the feature generator and a plurality of machine learning models for a plurality of iterations to generate a fourth plurality of features, wherein the plurality of machine learning models is different from the first machine learning model, the second machine learning model, and the third machine learning model;

select one or more features of the fourth plurality of features;

select a fourth machine learning model of the plurality of machine learning models;

run a fifth machine learning model pipeline with the selected one or more features of the fourth plurality of features and the selected fourth machine learning model;

respond to the machine learning task based on an output of the run of the fifth machine learning model pipeline; and store the fifth machine learning model pipeline in the database in correlation with the at least one first tag.

11. The computing device of claim 10, wherein the execution of the machine learning modeling code further causes the computing device to select the one or more features of the fourth plurality of features and the fourth machine learning model based on a performance metric.

12. The computing device of claim 11, wherein the execution of the machine learning modeling code causes the computing device to, after responding to the machine learning task, continue to run the feature generator and the plurality of machine learning models for a plurality of iterations to improve a performance of the fifth machine learning model pipeline with respect to the performance metric.

13. A non-transitory computer readable storage medium tangibly embodying a computer readable program code having computer readable instructions that, when executed, causes a computing device to:

receive, from a user, a machine learning task, a set of first tags related to the machine learning task, and a data set;

receive, from the user, a feature generator comprising executable logic for generating a first plurality of features based on the data set, wherein the feature generator received, by the computing device, from the user is a model building block that defines one or more operations for selecting and processing data in the data set, and the first plurality of features is input to a first machine learning model pipeline to perform the machine learning task;

receive, from the user, a tags library, the tags library structured as a node-relationship graph defining relations between the set of first tags;

search, by the computing device, the tags library using a graph traversal algorithm to identify a second tag matching at least one first tag of the set of first tags;

determine, based on the search of the tags library, whether a database including a machine learning model pipelines library stores the first machine learning model pipeline correlated in the database with the second tag matching the at least one first tag; and upon determining that the database stores the first machine learning model pipeline:

retrieve the first machine learning model pipeline that includes a first machine learning model;

run the retrieved first machine learning model pipeline on the data set based on the first plurality of features; and respond to the machine learning task based on an output of the run of the retrieved first machine learning model pipeline.

14. The non-transitory computer readable storage medium of claim 13, wherein the computer readable instructions, when executed, further causes the computing device to:

upon determining that the first machine learning model pipeline is not stored in the database, search the tags library using the graph traversal algorithm to identify a third tag related to the at least one first tag;

determine whether the database stores a second machine learning model pipeline correlated with the third tag; and upon determining that the second machine learning model pipeline is stored in the database:

retrieve, by the computing device, the second machine learning model pipeline;

run the feature generator and a second machine learning model in the retrieved second machine learning model pipeline for a plurality of iterations to generate a second plurality of features based on the data set;

select one or more features of the second plurality of features;

run a third machine learning model pipeline with the selected one or more features of the second plurality of features and the second machine learning model;

respond to the machine learning task based on an output of the run the third machine learning model pipeline; and store the third machine learning model pipeline in the database in correlation with the third tag.

15. The non-transitory computer readable storage medium device of claim 14, wherein the computer readable instructions, when executed, further causes the computing device to:

upon determining that the second machine learning model pipeline is not stored in the database:

run the feature generator and a third machine learning model for a plurality of iterations to generate a third plurality of features;

select one or more features of the third plurality of features;

run a fourth machine learning model pipeline with the selected one or more features of the third plurality of features and the third machine learning model;

respond to the machine learning task based on an output of the run the fourth machine learning model pipeline; and store the fourth machine learning model pipeline in the database in correlation with the at least one first tag.

16. The non-transitory computer readable storage medium of claim 15, wherein the computer readable instructions, when executed, further causes the computing device to:

run the feature generator and a plurality of machine learning models for a plurality of iterations to generate a fourth plurality of features, wherein the plurality of machine learning models is different from the first machine learning model, the second machine learning model, and the third machine learning model;

select one or more features of the fourth plurality of features;

select a fourth machine learning model of the plurality of machine learning models;

run a fifth machine learning model pipeline with the selected one or more features of the fourth plurality of features and the selected fourth machine learning model;

respond to the machine learning task based on an output of the run of the fifth machine learning model pipeline; and store the fifth machine learning model pipeline in the database in correlation with the at least one first tag.

17. The non-transitory computer readable storage medium of claim 16, wherein the computer readable instructions, when executed, further causes the computing device to select the one or more features of the fourth plurality of features and the fourth machine learning model based on a performance metric.

* * * * *